United States Patent
Bouchard et al.

(10) Patent No.: US 8,145,073 B2
(45) Date of Patent: Mar. 27, 2012

(54) SYSTEM AND METHOD FOR IMPROVING FAILURE DETECTION USING COLLECTIVE INTELLIGENCE WITH END-USER FEEDBACK

(75) Inventors: Guillaume Bouchard, Crolles (FR); Victor Ciriza, La Tour du Pin (FR); Laurent Donini, Grenoble (FR); Pascal Valobra, Meylan (FR)

(73) Assignee: Xerox Corporation, Norwalk, CT (US)

( * ) Notice: Subject to any disclaimer, the term of this patent is extended or adjusted under 35 U.S.C. 154(b) by 603 days.

(21) Appl. No.: 12/328,276

(22) Filed: Dec. 4, 2008

(65) Prior Publication Data
US 2010/0145647 A1 Jun. 10, 2010

(51) Int. Cl.
G03G 15/00 (2006.01)
G03G 21/00 (2006.01)
(52) U.S. Cl. .............. 399/8; 358/1.15; 399/9
(58) Field of Classification Search .......... 399/8, 9, 399/10, 42; 358/1.1, 1.15
See application file for complete search history.

(56) References Cited

U.S. PATENT DOCUMENTS

| | | | |
|---|---|---|---|
| 5,956,637 A | 9/1999 | Ericsson et al. | |
| 6,262,657 B1 | 7/2001 | Okuda et al. | |
| 7,096,158 B2 | 8/2006 | Kitada et al. | |
| 7,623,256 B2* | 11/2009 | Ciriza et al. | 358/1.15 |
| 2004/0199396 A1 | 10/2004 | Carter | |
| 2004/0252324 A1* | 12/2004 | Ohta | 358/1.14 |
| 2005/0027486 A1 | 2/2005 | Kitada et al. | |
| 2006/0236395 A1 | 10/2006 | Barker et al. | |
| 2007/0179987 A1 | 8/2007 | Lim | |
| 2007/0220365 A1 | 9/2007 | Castellani et al. | |
| 2007/0258723 A1* | 11/2007 | Nakazato et al. | 399/9 |
| 2007/0268509 A1 | 11/2007 | Andreoli et al. | |
| 2008/0075492 A1 | 3/2008 | Mestha et al. | |
| 2008/0246987 A1 | 10/2008 | Scrafford et al. | |

FOREIGN PATENT DOCUMENTS

| JP | 2003022125 A | * | 1/2003 |
|---|---|---|---|
| JP | 2006216017 A | * | 8/2006 |

OTHER PUBLICATIONS

U.S. Appl. No. 12/201,093, filed Aug. 29, 2008, Bouchard et al.
Peter E. Hart et al., "Query-Free Information Retrieval," Cooperative Information Systems, 0885-9000/97, 1997 IEEE, pp. 32-37.
Robi Polikar, "Ensemble Based Systems in Decision Making," 1531-636X/06, 2006 IEEE, pp. 21-45.
Finn V. Jensen et al., "The SACSO methodology for troubleshooting complex systems," Artificial Intelligence for Engineering Design, Analysis and Manufacturing (2001), 15, pp. 321-333.

* cited by examiner

*Primary Examiner* — David Gray
*Assistant Examiner* — Fred L Braun
(74) *Attorney, Agent, or Firm* — Fay Sharpe LLP (57) ABSTRACT

Systems and methods are described that facilitate using end-user feedback to automatically distinguish between a normal behavior and a device failure which can be a hard failure (e.g., a device malfunction) or a soft failure. For instance, upon detection of a usage switch from a first device to a second device by a user, a survey message is sent to the user to solicit information regarding the reasons for the switch. If the switch was triggered by a device malfunction, the detected device failure is verified and an alert is sent to an administrator and/or potentially impacted users. If the switch was triggered by the user's need for functionality (e.g., color printing, collation, etc.) not provided by the first device, which is otherwise functioning properly, then the detected failure is determined to be a failure and the failure detection algorithm is updated accordingly.

18 Claims, 6 Drawing Sheets

FIG. 1

```
                                    ┌─ 40
┌─────────────────────────────────────────────────────────────┐
│     SOFT FAILURE DETECTION - COLLECTIVE INTELLIGENCE SYSTEM │
├─────────────────────────────────────────────────────────────┤
│ SYSTEM DETECTED THAT PRINTER "PRINTER 1" MIGHT NOT PROVIDE ITS FULL SERVICE LEVEL
│ YOU SWITCHED TO OTHER DEVICES
│
│    PRINT 0 WHICH IS A COLOR PRINTER
│    PRINT 2 WHICH IS A COLOR PRINTER
│
│ PLEASE HELP BY IMPROVING THE PRINTER SOFT FAILURE DETECTION SYSTEM AND ASSURING
│ THE QUALITY OF SERVICE BY ANSWERING THIS SURVEY──── 42
│
│ THIS EMAIL HAS BEEN AUTOMATICALLY GENERATED BY MONITOR:
│ XRCE MONITOR
└─────────────────────────────────────────────────────────────┘
```

FIG. 2

```
                                    ┌─ 50
┌─────────────────────────────────────────────────────────────┐
│                      XEROX DEVICE MANAGER                   │
├─────────────────────────────────────────────────────────────┤
│ CHOOSE THE BEST EXPLANATION OF YOUR SWITCH:
│      ○ PRINTER MALFUNCTION
│      ○ I CHANGED MY BEHAVIOR
│ PLEASE LEAVE YOUR COMMENTS ON THE PRINTER AND SOFT FAILURE DETECTION ALERTER
│   ┌─────────────────────────────────────────────────────┐
│   │                                                     │
│   │                                                     │
│   └─────────────────────────────────────────────────────┘
│
│ YOUR INPUT WILL BE STORED IN THE SYSTEM DATABASE[1]
│                         [ SEND ]
│
│   ☐ DO NOT SEND ME THIS KIND OF SURVEY ANYMORE
│   [1] THE COLLECTED INFORMATION IS FOR SCIENTIFIC USAGE ONLY
│
│                          XEROX
└─────────────────────────────────────────────────────────────┘
```

FIG. 3

CHOOSE THE BEST EXPLANATION OF YOUR SWITCH — 60

- ● PRINTER MALFUNCTION
- ○ I CHANGED MY BEHAVIOR

WHICH MALFUNCTION DESCRIBES BEST THE PROBLEM?

- ○ PAPER JAM
- ○ QUALITY PROBLEM
- ○ OFFLINE
- ○ CONSUMABLE PROBLEM

*FIG. 4*

CHOOSE THE BEST EXPLANATION OF YOUR SWITCH — 70

- ○ PRINTER MALFUNCTION
- ● I CHANGED MY BEHAVIOR

WHICH DID YOU CHANGE TO THIS PRINTER?

- ○ I MOVED TO ANOTHER OFFICE
- ○ I NEEDED SPECIAL FUNCTIONALITY (COLOR, STAPLE, DUPLEX...)
- ○ I TEMPORARILY WORKED IN ANOTHER LOCATION
- ○ OTHER

SOFT FAILURE DETECTION - COLLECTIVE INTELLIGENCE SYSTEM — 80

SYSTEM DETECTED THAT PRINTER "LEQUIPE-1" MIGHT NOT PROVIDE ITS FULL SERVICE LEVEL

YOU USED THIS PRINTER RECENTLY. SYSTEM NEEDS YOUR INPUT IN ORDER TO DETERMINE THE REAL PRINTER STATUS.

PLEASE HELP BY IMPROVING THE PRINTER SOFT FAILURE DETECTION SYSTEM AND ASSURING THE QUALITY OF SERVICE BY ANSWERING THIS SURVEY — 82

---

THIS EMAIL HAS BEEN AUTOMATICALLY GENERATED BY MONITOR:
XRCE MONITOR

WHAT WAS THE DEVICE STATUS? — 90

○ THE PRINTER DID NOT WORK CORRECTLY
◉ I DON'T HAVE ENOUGH INFORMATION
○ THE PRINTER WAS WORKING CORRECTLY

FIG. 7

WHAT WAS THE DEVICE STATUS?

⊙ THE PRINTER DID NOT WORK CORRECTLY
○ I DON'T HAVE ENOUGH INFORMATION
○ THE PRINTER WAS WORKING CORRECTLY

WHICH MALFUNCTION DESCRIBES BEST THE PROBLEM?

○ PAPER JAM
○ QUALITY PROBLEM
○ OFFLINE
○ CONSUMABLE PROBLEM

SYSTEM AND METHOD FOR IMPROVING FAILURE DETECTION USING COLLECTIVE INTELLIGENCE WITH END-USER FEEDBACK

BACKGROUND

The subject application relates to failure detection in device networks. While the systems and methods described herein relate to distinguishing between hard and soft failures in device networks such as printing networks and the like, it will be appreciated that the described techniques may find application in other network systems, other failure detection applications, etc.

When using an automatic failure detection system in a print infrastructure, a probabilistic approach examining printer usage pattern changes cannot guarantee a perfect accuracy. An existing approach of monitoring devices based on sensor devices does not guarantee that all incidents will be detected correctly. One example is the occurrence of repetitive paper jams: the printer does not work properly, but the printer system declares that it is working properly once the jam has been removed. In contrast, the users know in this case that the printer will fail to print the next paper. Conventional systems cannot solicit or employ user's feedback, but rather rely on hardware to warn a network administrator about potential failures.

There are several possible scenarios that can be observed with regard to the output behavior of a conventional printing network. For instance, a large number of users who switch between a first device (e.g., a first printer) and a second device (e.g., a second printer) can thereby overload the second device and cause the network to report a failure condition at the second device. In another scenario, false alarms or fault conditions may be reported when a small number of users change their device usage due to a precise print resource need (e.g., color printing, large format, etc.), causing the network to report a false failure. In another scenario, the network operates normally and no failure is reported.

Conventional systems are subject to errors and imperfect decisions due to the generative nature of their algorithms, which make use of "priors" (e.g., historical usage information and/or patterns) that may not be applicable for all users and/or all situations. An example is the false positive alerts generated by individual usage changes due to a specific need for specific features that are provided by fewer than all devices in the network (e.g., binding, high quality photo printing, collating, etc.).

Conventional monitoring systems make use of device data coming from sensor information data aggregated by embedded rules coded in the device's firmware. The capabilities of such monitoring systems are basically limited by two aspects: available sensor data and its quality, and capability of the device embedded rules to explain failure states based on the limited sensor data. Current embedded device monitoring systems suffer from weaknesses in both aspects.

Typically, quality image problems are not detectable by the internal monitoring systems of the device due to the unavailability of image quality sensors (e.g., a camera) in the device's output. Adding new sensors to increase the monitoring capabilities of devices is only possible in high-end production devices, while in office devices where sales margins need to remain high while products stay competitive there is little possibility of adding new sensors.

Embedded diagnosis rule based systems are also limited not only by the data but also by the inherent limitations of rules systems. With rule-based systems, it is difficult to target complex failure patterns. For example, it is difficult to define the conditions of failures when complex temporal dependencies are involved. Writing rules with some degree of uncertainty or variability in the way the failure can be inferred from sensor data is in general difficult to express using simple rules. Nevertheless rule-based systems are today's standard commercial solution.

While the embedded diagnosis systems are slowly evolving, users are still suffering from device failures that are difficult to characterize, making devices unavailable and not always identified as unavailable from the device's sensor data. This results in users collectively switching from one device to another without having the user making a specific failure report to the IT administrator in most cases.

Accordingly, there is an unmet need for systems and/or methods that facilitate overcoming the aforementioned deficiencies.

BRIEF DESCRIPTION

In accordance with various aspects described herein, systems and methods are described that facilitate distinguishing between hard and soft failures in a device network and continuously updating a soft-failure detection algorithm using user feedback. For example, a method of detecting device failures in a networked device infrastructure comprises storing historical data including device usage logs and historical device failure data for a plurality of devices in a device network, executing an algorithm that computes a probability that a device in the device network is in a failure state, and updating the probability that the device is in a failure state as a function of the computed probability and the historical data. The method further includes determining whether a failure is present based on the updated probability. The method is performed for each device in the plurality of devices.

According to another feature described herein, a soft failure detection (SFD) system comprises a database that stores information related to user interactions between one or more users and a plurality of devices in a network, a device manager that executes a failure detection algorithm that detects a failure condition at a first device, and a usage switch analysis (USA) component that analyzes interaction records to determine whether a user has switched from a first device to a second device and requests user feedback upon detection of a usage switch by the user. The system further comprises a feedback database that stores user feedback for analysis by the USA component. The USA component determines whether the detected failure condition is a hard failure or a soft failure.

Yet another feature relates to an apparatus for failure detection in a device network, comprising means for storing historical data including device usage logs and historical device failure data for a plurality of devices in a device network, and means for executing a decision algorithm that computes a probability that a device in the device network is in a failure state. The apparatus further comprises means for updating the probability that the device is in a failure state as a function of the computed probability and the historical data, and means for soliciting and receiving user feedback related to device status.

DETAILED DESCRIPTION

In accordance with various features described herein, systems and methods are described that facilitate using end-user feedback in order to automatically send users a request for details about a potential failure based on a detected change in their usage behavior, and adjust and tune the system so that the generative algorithm used in the soft failure detection (SFD) system gains specific knowledge of the environment and therefore becomes progressively more accurate. These aspects facilitate establishing a better link with the end user and improve the perceived level of quality of service while allowing the customer or user to selectively disable the feedback queries for input at any time.

Figure 1:
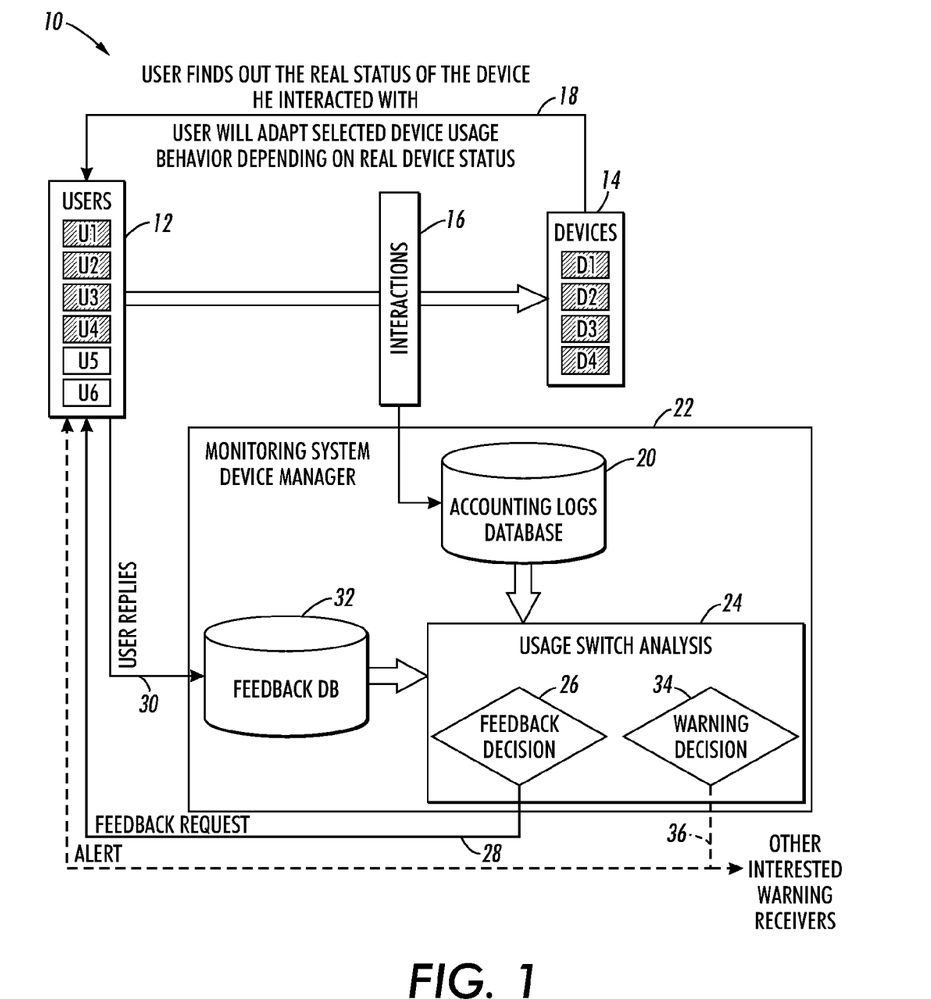
FIG. 1 illustrates an SFD system that facilitates usage pattern analysis for device fleet monitoring by modeling and detecting changes in usage behaviors.

With reference to FIG. 1, an SFD system 10 is illustrated that facilitates usage pattern analysis for device fleet monitoring by modeling and detecting changes in usage behaviors. The system improves the quality of service provided to users, which improves user satisfaction. "Soft" failure detection relates to detecting failures that are not necessarily monitored or detected by a device as establishing a "hard" failure condition. For instance, if the device is a printer, a hard failure condition may be a paper jam, an empty paper tray, a lack of toner, etc. A soft failure is a failure that occurs intermittently, may or may not raise a warning or a system fault condition, etc., such as a defect in a printed page (e.g., where text is printed lighter in one part of the page than in others, etc.).

A plurality of users 12 of the system 10 interact with a device infrastructure 14, including a plurality of devices D1-D4, through a plurality of interactions 16. FIG. 1 illustrates an example in which six users labeled U1-U6 employ four devices (e.g., printers, scanners, fax machines, free-access computers, cash machines, or any other type of shared device) labeled D1-D4, although more or fewer users and/or devices may be included, as will be appreciated. Status information 18 is provided to one or more users of the respective devices. Interaction information 16 is stored to an accounting logs database (ALD) 20 in a monitoring system device manager (MSDM) 22 for analysis and review. A usage switch analysis (USA) component 24 (e.g., a processor) analyzes the interaction information to detect failures (e.g., soft and/or hard failures) and makes decisions relating to requesting user feedback or issuing a warning or fault condition, etc., for a device from which one or more users switched or redirected usage. For instance, the USA component executes a feedback decision 26 (e.g., set of computer-executable instructions or algorithm(s) for determining whether user feedback is desired and for generating a feedback request message) and generates a feedback request 28 when information is desired from one or more users. User feedback information 30 is provided by one or more users and stored to a feedback database 32 for analysis by the USA component 24 in subsequent analysis of interaction information and the like. Additionally or alternatively, the USA component executes a warning or alert decision 34 (e.g., set of computer-executable instructions or algorithm(s) for detecting a fault condition and generating an alert message) to generate an alert message 36 when an alert condition (e.g., an imminent or extant fault condition, etc.) is detected. The alert message 36 is transmitted to one or more of the users and optionally to any other interested warning receivers (e.g., system administrators, other devices, etc.)

In one embodiment, the SFD system 10 is based on the dynamic analysis of the printing logs stored in the ALD 20, and identifies a possible problem on a given device (e.g., D1) when one or more users switch from the device, which is normally their preferred device, to another device (e.g., D2). For instance, the infrastructure 14 (e.g., devices in the network) includes the set of all devices that can interact with users 12 together with a communication network that transmits usage logs and device messages to ALD 20. The primary device of a given user is the device that is chosen by the user if every device in the infrastructure is working properly (e.g., a default printing device or the like). A usage switch (or redirection) occurs upon interaction between a user and a device that is different from the user's primary device. End-user feedback 30 includes additional data given by a device user and guided by a survey.

The system 10 facilitates involving customers or users in proactive device monitoring by requesting their participation through online customized questions. That is, the system 10 asks the user(s) to confirm or deny the fact that a given device is in a failure mode. User feedback can be presented to a system administrator in order to help the administrator identify real failure conditions. Moreover, the user feedback is used as a source of information to improve the SFD system 10 and/or the failure detection algorithm(s) executed thereby.

The system 10 analyzes (e.g., periodically, continuously, etc.) the device infrastructure 14 and checks for new user interaction records with devices. The USA component 24 executes a decision algorithm (e.g., a computer-executable set of instructions persistently stored to memory) that computes a probability that a given device is in a failure or fault state for all devices in a fixed group, given the known usage patterns and usage recently recorded in the ALD 20. If the system finds a failure in the infrastructure, all users potentially impacted by that failure are informed. Impacted users are users that need a specific functionality provided by the device or users who use the incriminated device as primary device (e.g., a default printer or the like). Accordingly, each user of a given device is advised of a failure of the given device if the device is the user's primary device.

When the user switches to another device and the ALD 20 is notified, the USA component 24 queries the user that switched with a small survey relating to the reasons for the user switch. If a user used a device considered to be in a fault condition at a given time by the SFD system, then the USA component 24 can request additional information about user interactions 16, in order to get an updated assessment of the device status. For instance, a query can be sent to the user of the failed device to inquire whether the device worked correctly. Additionally, during periods in which a given device is assessed as functioning normally with no failure, but where the uncertainty about device status is high, the MSDM 22 and/or the USA component 24 can request user feedback to be sure that a fault condition or failure is not overlooked. The rate of occurrence of request messages 30 can be limited (e.g., by an administrator or a system designer) to ensure that a user is not inundated with feedback request messages.

According to another embodiment, a user can voluntarily submit user feedback that the system can use to refine its failure detection algorithm(s). For instance, such an input system can be implemented on a remote service accessible from different client types such as a web browser, directly from the device itself so that user can immediately report a malfunction to the system (e.g., an extensible interface platform), a widget or an agent running on the user's workstation and providing a persistent communication channel with the monitoring system, etc.

The MSDM 22 collects user feedback for a predefined time period, and applies a logistic regression or other type of binary classifier such as a support vector machine (SVM), classification trees, K-nearest neighbors, naive Bayes classifier, etc., on collected user input to adjust failure classification parameters to optimize soft failure detection. User input is balanced or weighted with soft failure output so that the system 10 is calibrated on specific infrastructure usage. For instance, when a user repeatedly switches from a first device to a second device that provides functionality (e.g., color printing, stapling, collation, etc.) not provided by the first device, failure classification parameters can be weighted or adjusted to reduce the likelihood of such usage switches triggering a failure warning.

In one embodiment, the device infrastructure 14 is a printing network comprising a plurality of printing devices. A number of false alarms are known to be generally higher for printers that are rarely used compared to printers having many users. In this case, false alarms are generated on printers that do not have a usage pattern adapted to the priors of the generative usage switch detection system. The feedback mitigates false alarms and reassures users as to a quality of service they can expect from their IT infrastructure. According to an example, users submit print jobs to the printers, and one or more users change their principal printer due to a failure or fault condition. A system administrator (e.g., a technician, IT administrator, etc.) may want to be advised of such behavior immediately. A soft failure detection algorithm is executed by the MSDM 22 and/or the USA component 24 to analyze printing logs, detect user switches, and raise a "soft failure" alert 36. The system 10 monitors the infrastructure and improves itself based on user feedback collected.

Figure 2:
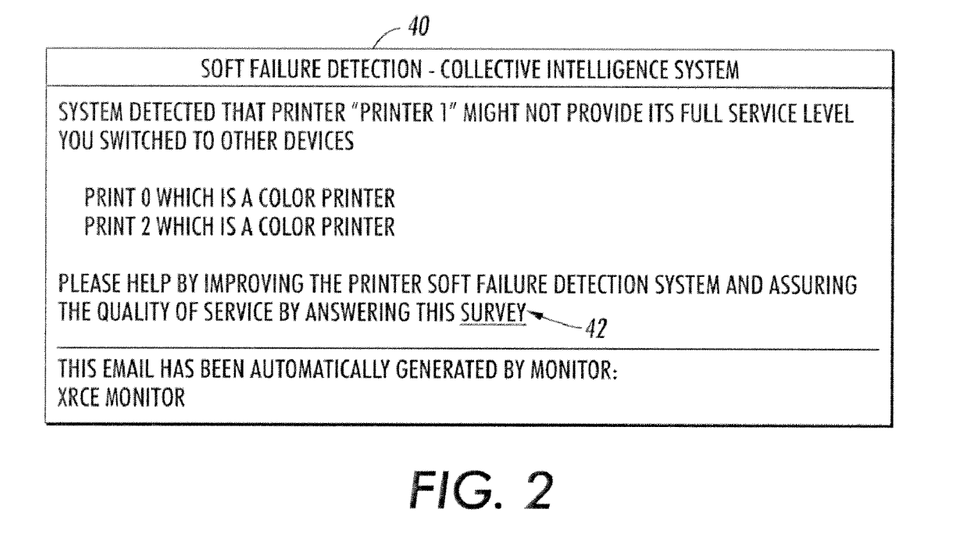
FIG. 2 illustrates an example of an email model or message that can be sent to a user that triggered a failure event by switching between devices.

FIG. 2 illustrates an example of an email model or message 40 that can be sent to a user that triggered a failure event by switching between devices. In the message 40, the current state of the printer is explained, although it can also be displayed using a visualization method described in U.S. patent application Ser. No. 12/201,093, entitled "Visualization of User Interactions in a System of Networked Devices," filed on Aug. 9, 2008, the entirety of which is hereby incorporated by reference. The user is also asked for input. The user can choose to assist in system improvement by following a given link 42 (e.g., inside the customer's internal network for security reasons, if desired). The message identifies to the user his principal or default printer, and requests information as to why user changed his usage behavior.

Figure 3:
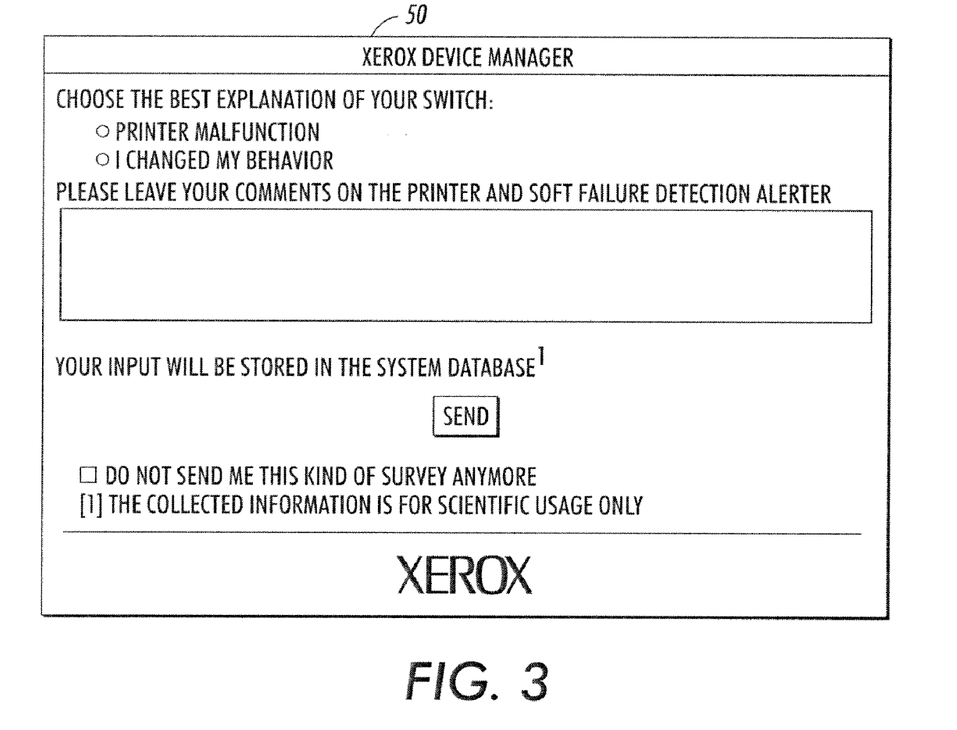
FIG. 3 illustrates an example of a survey message that is provided to the user upon selection of the link.

FIG. 3 illustrates an example of a survey message 50 that is provided to the user upon selection of the link 42 of FIG. 2. The survey prompts the user to select a reason for switching between devices, such as a device malfunction, a user preference (e.g., printing in color when the default printer is not a color printer), etc. Additionally, the user is permitted to enter a text explanation for the usage switch. According to another aspect, the user is provided with an option to opt out of future survey messages.

Figure 4:
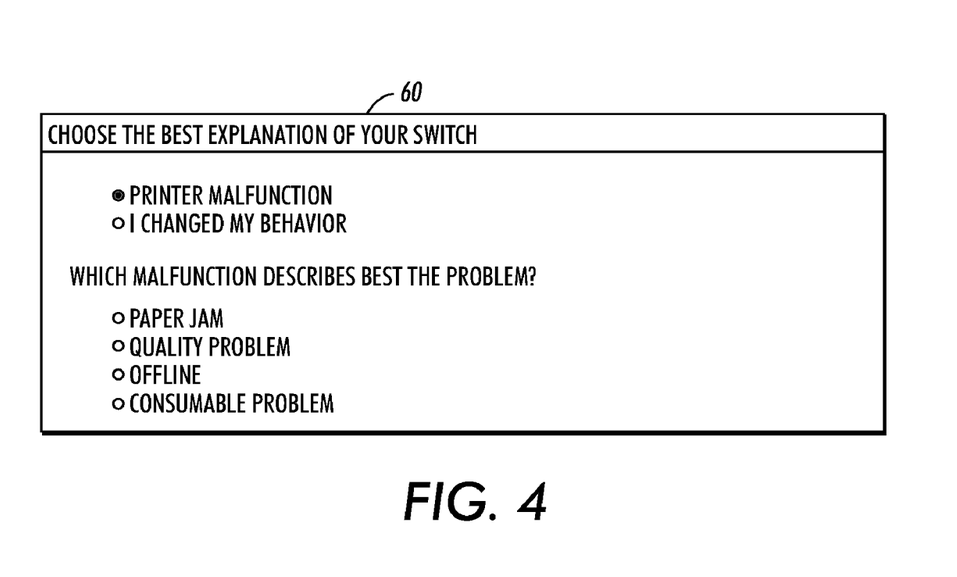
FIG. 4 illustrates an example of an additional survey message that is sent to the user upon selection of the device malfunction option.

FIG. 4 illustrates an example of an additional survey message 60 that is sent to the user upon selection of the device malfunction option. For instance, the user can be reminded of his usage change and provided with survey answer options. The system thus asks the user whether the printer "failure" was a hard failure (e.g., a real failure related to device malfunction) or whether the usage switch was made for another reason. If the user indicates that a hard failure occurred, then the message includes selectable options that the user may select to provide further information about the failure. Such options may include without being limited to a media related failure (e.g., a paper jam), a quality related failure (e.g., print too light or dark, or inconsistent), a network related failure (e.g., the user's default printer is offline), a consumable related failure (e.g., the default printer is out of toner, etc.), and the like.

Figure 5:
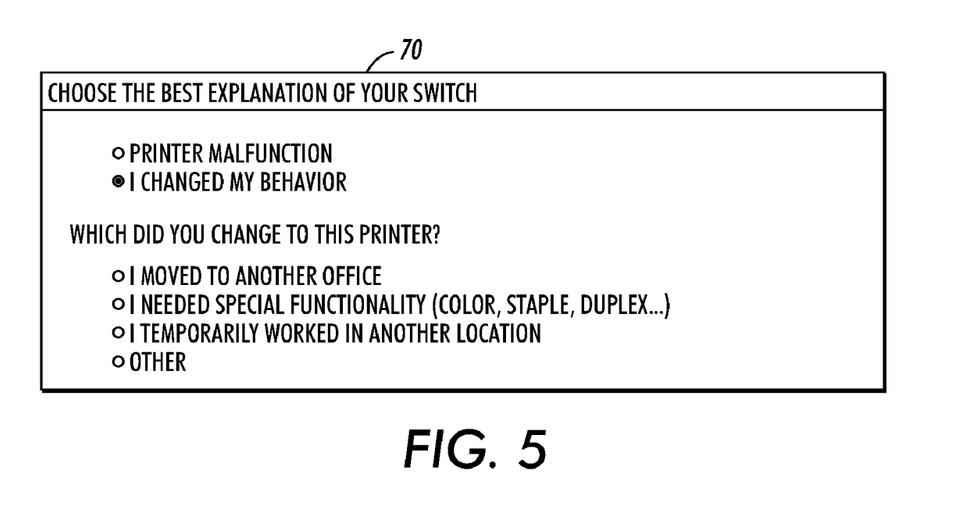
FIG. 5 illustrates an example of an additional survey message that is sent to the user upon selection the option indicating personal preference reasons for the usage switch.

FIG. 5 illustrates an example of an additional survey message 70 that is sent to the user upon selection. The option indicates personal preferred reasons for the usage switch. Upon selection of this option by the user, the system inquires as to the reason for the usage switch by presenting to the user several possible selectable reasons for the switch (e.g., physical relocation of the user's computer, special functionality requirements, temporary relocation of the user, etc.). In addition, in the same form, the user is permitted to add free text comments and/or to ask the system to stop requesting for input.

Figure 6:
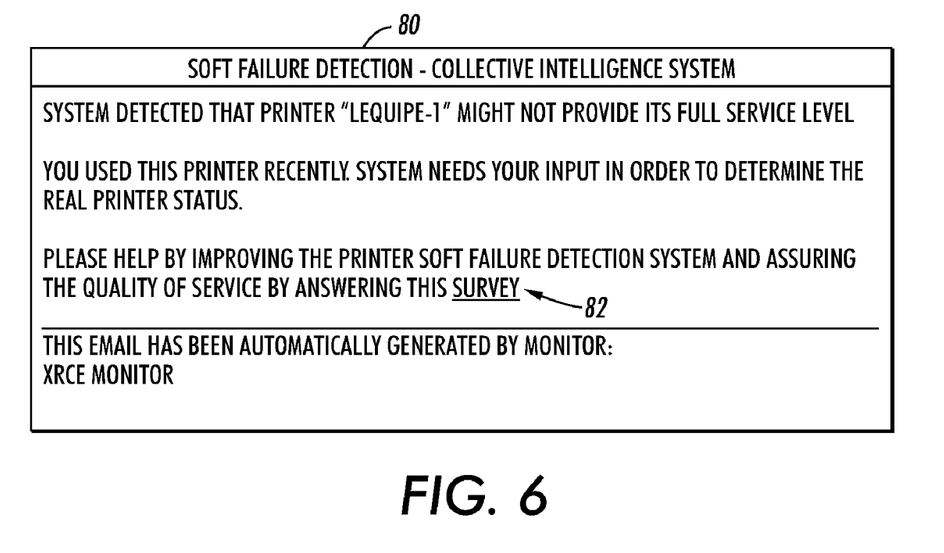
FIG. 6 illustrates an example of an email or message that is sent to a user who continues to use a device despite a failure or fault condition detected for the device.

FIG. 6 illustrates an example of an email or message 80 that is sent to a user who continues to use a device despite a failure or fault condition detected for the device. Such usage behavior may occur, for example, when a user is unaware of a real failure and therefore discovers the failure after attempting to print a job. Alternatively, such usage behavior may occur when users do not use the part of the device causing the fault condition (e.g., when a duplex mode is not working but the user is not using the duplex mode functionality). Moreover, users with knowledge that the printer has just been repaired or is no longer in failure mode may continue to use a device that is detected as having a fault condition, and therefore can provide the system with valuable information to update the device status. Accordingly, the message 80 requests user input and includes a link 82 that the user selects to provide device status update information.

Figure 7:
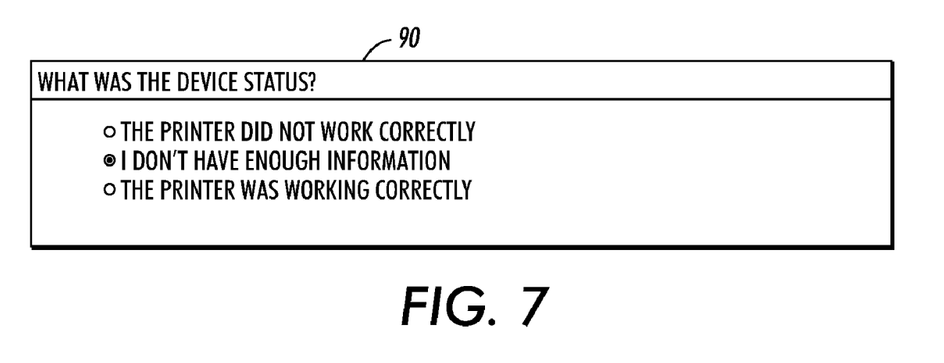
FIG. 7 illustrates an example of a survey message that is sent a user upon selection of the link.

FIG. 7 illustrates an example of a survey message 90 that is sent to a user upon selection of the link 82 of FIG. 6. The survey provides the user with multiple selectable input options, by which the user indicates that the detected failure is a hard failure, that the detected failure is a soft failure, or that the user does not have enough information to provide any feedback. Selection of the "not enough information" input option can result in cessation of solicitation for user input related to the detected failure or can prompt further survey messages to be transmitted to the user. Selection of the option indicating that the device is working properly causes the system to establish a link with the user.

Figure 8:
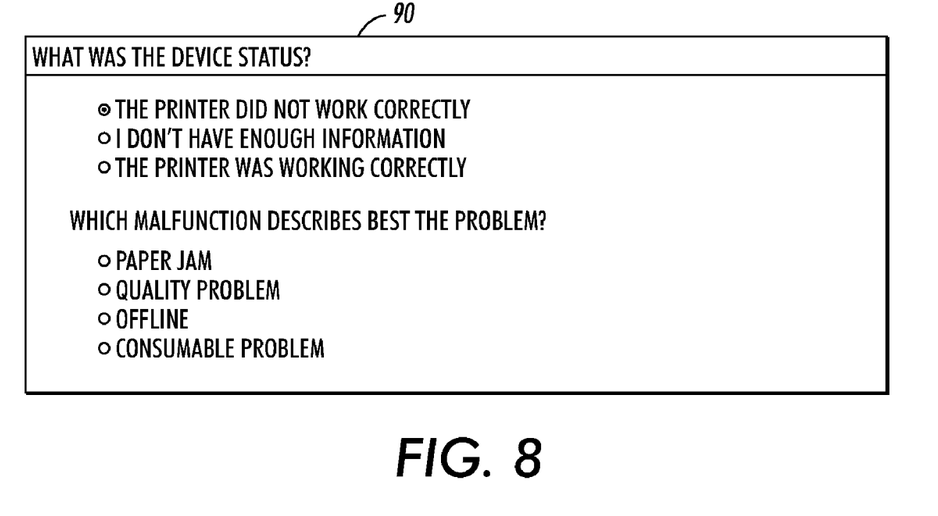
FIG. 8 illustrates an example of a survey message that is sent to a user upon user indication that the detected failure is a hard failure, in which a set of selectable input options is presented to the user.

FIG. 8 illustrates an example of a survey message 90 that is sent to a user upon user indication that the detected failure is a hard failure, in which a set of selectable input options is presented to the user. Such options may include without being limited to a media related failure (e.g., a paper jam), a quality related failure (e.g., print too light or dark, or inconsistent), a network related failure (e.g., the user's default printer is offline), a consumable related failure (e.g., the default printer is out of toner, etc.), and the like. In one embodiment, the user is able to add free text comments and/or to ask the system to stop requesting user input at any point during the survey process.

Using the information collected through the survey messages, the system establishes a link with the end user and improves the perceived level of quality of the print service while allowing the customer to disable the possibility of being asked or bothered for input at any time. The precision of the failure detection algorithm is improved due to the inclusion of user feedback as a source of annotated data, which increases the pertinence and performance of the usage pattern-based monitoring methodology, with or without an administrator's attendance.

Figure 9:
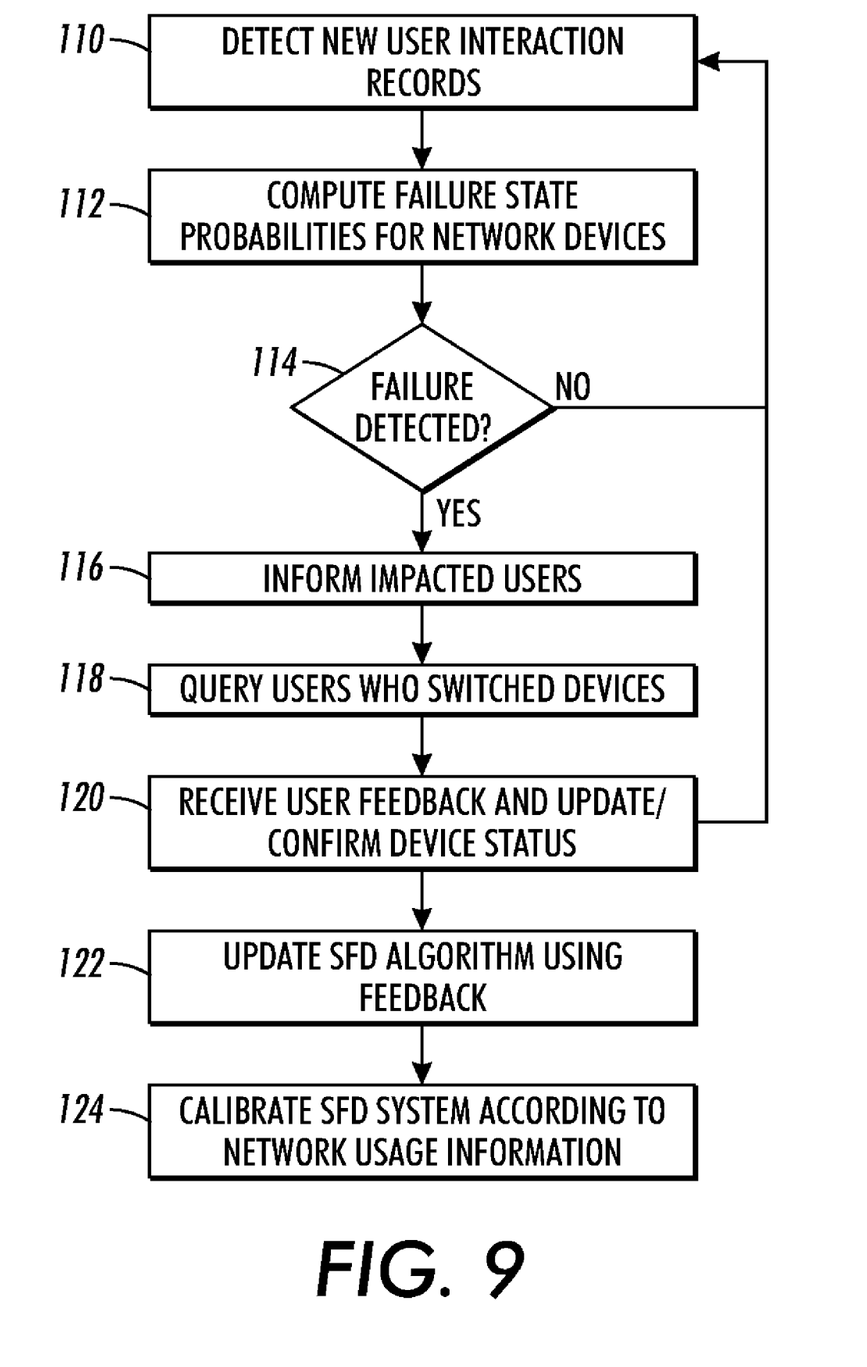
FIG. 9 illustrates a method verifying device status for devices in a network using user feedback, in accordance with various aspects described herein.

FIG. 9 illustrates a method verifying device status for devices in a network using user feedback, in accordance with various aspects described herein. At 110, new user interaction records are detected. For instance, a user interaction record can include information related to a user's use of a network device (e.g., a printer, scanner, etc.), and may include information indicative of a usage switch from the user's default device to another device. At 112, an SFD algorithm is executed that computes a probability that one or more of the devices in the network (or a subset thereof) is in a failure state, given historical usage patterns and the newly detected usage interaction records. For instance, a user switch from the user's default printer to another printer may indicate a failure.

At 114, a determination is made regarding whether a failure is detected, based on the output of the SFD algorithm. If no failure is detected, then the method reverts to 110 for further network monitoring and usage interaction detection. If a failure is detected, then at 116, potentially impacted users (e.g., users whose default device is the device for which a failure state is detected, users who use the device for a specific function, such as color printing, etc.) are informed thereof.

At 118, one or more users whose interaction records indicated that they switched devices are queried as to the reasons for the switch. At 120, user feedback is received and the device(s) status is updated and/or verified. For instance, if the user switched from a first device to a second device because the first device did not work properly, then the failure status of the first device is confirmed. Alternatively, if the user switched because the user needed functionality that is not provided by the first device, but the first device is otherwise working properly, then the failure status for the first device is updated to a normal status. The method continues monitoring at 110 upon device status update or confirmation.

At 122, the SFD algorithm is updated (e.g., a classifier or the like is trained) as a function of the user feedback. For example, if the user indicated that the usage switch was a result of a need for functionality provided by the second device, and not due to a failure of the first device, then the SFD algorithm can be updated to overlook future usages switches from the first device to the second device by that user. At 124, the SFD system is calibrated according to the updated network usage information, and the SFD algorithm update(s) is applied.

In another embodiment, a user who is queried about a usage switch can opt out of future surveys or queries, in order to mitigate solicitation of user feedback from a user who does not wish to participate.

It will be appreciated that several of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of detecting device failures in a networked device infrastructure, comprising:
   storing historical data including device usage logs and historical device failure data for a plurality of devices in a device network;
   executing an algorithm that computes a probability that a device in the device network is in a failure state;
   updating the probability that the device is in a failure state as a function of the computed probability and the historical data; and
   determining whether a failure is present based on the updated probability;
   wherein the method is performed for each device in the plurality of devices; and
   further comprising storing user feedback information as historical data and soliciting the user feedback information by sending an indicator message with a survey questionnaire or a link to a survey questionnaire to at least one user whose usage log indicates a usage switch from a principal device to a secondary device, wherein the questionnaire requests information related to the cause of the switch.

2. The method of claim 1, further comprising requesting that the user specifies at least one of a device malfunction or a user-initiated device switch as the reason for the usage switch from the principal device to the secondary device.

3. The method of claim 2, further comprising determining that the failure is a soft failure and requesting user feedback regarding at least one reason for the user-initiated device switch.

4. The method of claim 3, further comprising adjusting a soft failure detection algorithm to exclude future usage switches by the user from the principal device to the secondary device from being classified as failures.

5. The method of claim 2, further comprising that the failure is a hard failure upon user feedback indicating a device malfunction.

6. The method of claim 1, further comprising confirming the failure status of the device upon receiving user feedback indicating that a switch from the device to a secondary device was prompted by a failure condition at the device.

7. The method of claim 1, further comprising permitting the user to opt out of future feedback solicitation.

8. The method of claim 1, further comprising outputting the failure status of the principal device to a network administrator.

9. The method of claim 1, wherein the principal and secondary devices are printers.

10. An apparatus for detecting device failures in a networked device infrastructure, comprising:
    means for storing historical data including device usage logs and historical device failure data for a plurality of devices in a device network;
    means for executing a decision algorithm that computes a probability that a device in the device network is in a failure state;
    means for updating the probability that the device is in a failure state as a function of the computed probability and the historical data; and
    means for soliciting and receiving user feedback related to device status; and means for storing user feedback information as historical data;

wherein the means for soliciting and receiving solicits the user feedback by sending an indicator message with a survey questionnaire or a link to a survey questionnaire to at least one user whose usage log indicates a usage switch from a principal device to a secondary device, wherein the questionnaire requests information related to the cause of the switch.

11. A failure detection system, comprising:
a database that stores information related to user interactions between one or more users and a plurality of devices in a network;
a device manager that executes a failure detection algorithm that detects a failure condition at a first device;
a usage switch analysis (USA) component that analyzes interaction records to determine whether a user has switched from a first device to a second device and requests user feedback upon detection of a usage switch by the user; and
a feedback database that stores user feedback for analysis by the USA component;
wherein the USA component determines whether the detected usage condition is a failure or not.

12. The system of claim 11, wherein the USA component sends a survey message to the user requesting that the user indicate whether the usage switch was caused by a malfunction at the first device or by user preference.

13. The system of claim 12, wherein the USA component outputs an alert message upon receiving user feedback indicating a device malfunction.

14. The system of claim 12, wherein the survey message comprises a request for information related to the reason for the usage switch upon receipt of user feedback indicating that the usage switch was caused by user preference.

15. The system of claim 14, wherein the survey message comprises a list of user-selectable reasons for the usage switch, the reasons comprising one or more of a permanent change in user location, a temporary change in user location, and a need for device functionality not provided by the first device.

16. The system of claim 15, wherein the device manager updates the failure detection algorithm according to the received user feedback to reduce the likelihood that a future usage switch by the user from the first device to the second device will trigger a failure condition.

17. The system of claim 12, wherein the survey message includes a user-selectable option to exclude the user from feedback requests.

18. The system of claim 11, wherein the first and second devices are printing devices.

* * * * *